United States Patent
Kroekel et al.

(10) Patent No.: US 11,146,719 B2
(45) Date of Patent: Oct. 12, 2021

(54) CAMERA SYSTEM HAVING DIFFERENT SHUTTER MODES

(71) Applicant: Conti Temic microelectronic GmbH, Nuremberg (DE)

(72) Inventors: Dieter Kroekel, Eriskirch (DE); Stefan Hegemann, Wangen (DE); Stefan Heinrich, Achern (DE); Simon Hachfeld, Lindau (DE); Aless Lasaruk, Lindau (DE); Reik Mueller, Oberreitnau (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 37 days.

(21) Appl. No.: 16/612,477

(22) PCT Filed: Dec. 5, 2017

(86) PCT No.: PCT/DE2017/200125
§ 371 (c)(1),
(2) Date: Nov. 11, 2019

(87) PCT Pub. No.: WO2018/233733
PCT Pub. Date: Dec. 27, 2018

(65) Prior Publication Data
US 2020/0128161 A1     Apr. 23, 2020

(30) Foreign Application Priority Data
Jun. 21, 2017    (DE) .................. 10 2017 210 408.2

(51) Int. Cl.
*H04N 5/225*     (2006.01)
*H04N 5/235*     (2006.01)
(Continued)

(52) U.S. Cl.
CPC ............. *H04N 5/2258* (2013.01); *H04N 5/06* (2013.01); *H04N 5/2353* (2013.01); *H04N 5/23218* (2018.08); *H04N 5/3532* (2013.01)

(58) Field of Classification Search
CPC .... H04N 5/2258; H04N 5/23218; H04N 5/06; H04N 5/2353; H04N 5/3532;
(Continued)

(56) References Cited

U.S. PATENT DOCUMENTS

| | | | |
|---|---|---|---|
| 6,847,392 B1 * | 1/2005 | House | H04N 13/25 348/36 |
| 10,334,234 B2 | 6/2019 | Adomat et al. | |

(Continued)

FOREIGN PATENT DOCUMENTS

| | | |
|---|---|---|
| DE | 112013001647 | 12/2014 |
| DE | 102014220585 | 4/2016 |

(Continued)

OTHER PUBLICATIONS

English translation of the International Search Report of the International Searching Authority for International Application PCT/DE2017/200125, dated Mar. 22, 2018, 3 pages, European Patent Office, HV Rijswijk, Netherlands.

(Continued)

*Primary Examiner* — Nelson D. Hernández Hernández
(74) *Attorney, Agent, or Firm* — W. F. Fasse

(57) ABSTRACT

A stereo camera system for a driver assistance system includes a first camera having a first aperture angle and a second camera having a second aperture angle, wherein the first camera produces a wide-angle camera image, the second camera produces a telephoto camera image, and the two camera images have an area of overlap. The first camera is a rolling shutter camera and the second camera is a global (Continued)

shutter camera. The two cameras' shutters are synchronized with one another in particular manners.

17 Claims, 2 Drawing Sheets

(51) Int. Cl.
  *H04N 5/353* (2011.01)
  *H04N 5/232* (2006.01)
  *H04N 5/06* (2006.01)

(58) Field of Classification Search
  CPC .... H04N 5/2354; H04N 5/2628; H04N 13/25; H04N 13/296; H04N 13/239
  See application file for complete search history.

(56) References Cited

U.S. PATENT DOCUMENTS

| | | | |
|---|---|---|---|
| 2014/0198184 A1* | 7/2014 | Stein | H04N 5/3532 348/47 |
| 2015/0035984 A1 | 2/2015 | Otsuka | |

FOREIGN PATENT DOCUMENTS

| | | | |
|---|---|---|---|
| KR | 1020160035473 | 3/2016 | |
| KR | 10-1610512 | 4/2016 | |
| KR | 101610512 B1 * | 4/2016 | ............ H04N 13/02 |
| WO | WO2014/111814 | 7/2014 | |

OTHER PUBLICATIONS

PCT International Preliminary Report on Patentability including English Translation of PCT Written Opinion of the International Searching Authority for International Application PCT/DE2017/200125, dated Dec. 24, 2019, 6 pages, International Bureau of WIPO, Geneva, Switzerland.

German Search Report for German Patent Application No. 10 2017 210 408.2, dated Oct. 17, 2017, 7 pages, German Patent and Trademark Office, Muenchen, Germany, with partial English translation, 5 pages.

* cited by examiner

CAMERA SYSTEM HAVING DIFFERENT SHUTTER MODES

FIELD OF THE INVENTION

The invention relates to a camera system, in particular a stereo camera system, for a driver assistance system, comprising a camera having a rolling shutter and a camera having a global shutter.

BACKGROUND INFORMATION

Standard stereo cameras known from the prior art consist of two identical cameras which both have the same aperture angle and the same imagers with the same shutter modes. In the case of the shutter modes, a distinction is made between rolling shutters (wherein the pixels are successively exposed and read out) and global shutters (wherein all of the pixels are simultaneously exposed and subsequently successively read out).

Stereo cameras are preferably operated with global shutter imagers, since a synchronization of all of the pixels of the imagers can be realized simply, even with a different aperture angle. A good synchronicity of the exposure of the pixels can also be realized in the case of stereo cameras having rolling shutter imagers and the same aperture angle of the cameras, so that depth images can still be created with a high degree of precision.

SUMMARY OF THE INVENTION

The printed publication WO 2014/111814 A2 describes how imagers having a rolling shutter are to be synchronized if they are used in a stereo camera system, the cameras of which have a different aperture angle, in order to also produce depth images with acceptable precision with such camera systems.

It is accordingly an object of the invention to provide a new type of camera system, which is designed to capture depth images with a high degree of precision.

This object can be achieved by a device and by a method respectively in accordance with embodiments of the invention as set forth herein.

The first considerations were that not only can cameras having different aperture angles be used with stereo camera systems, but so can cameras which have different imagers and, in particular, which have different shutter modes. In this connection, it was important to provide sufficiently high accuracy during the distance determination, since the pixels of the two cameras are exposed at different times with different shutter modes.

The invention relates to a camera system, in particular a stereo camera system, for a driver assistance system, which comprises a first camera having a first aperture angle and a second camera having a second aperture angle, the first camera producing a wide-angle camera image and the second camera producing a telephoto camera image, the two camera images having an area of overlap. Here, the first camera is a rolling shutter camera and the second camera is a global shutter camera, the camera system being designed in such a way that the two cameras are synchronized. The optical axes of the first and the second camera can be parallel to one another.

Thanks to a suitable synchronization of the rolling shutter camera and the global shutter camera, it is possible to detect objects at large distances and to perform a distance determination. This is in particular advantageous in terms of driver assistance systems, since an early and precise recognition of potential risks, surroundings details or respectively further road users is necessary, in order to prompt the appropriate measures by the driver assistance system. The area of overlap is preferably arranged centrally in the captured wide-angle camera image. The area of overlap can, however, also be arranged in any other image region of the wide-angle image.

In a preferred embodiment, the rolling shutter camera is designed to trigger the synchronization. This means that the synchronization is effected such that when a specific pixel is exposed by the rolling shutter camera, the global shutter of the second camera is opened. At a point in time, the specific pixel of the rolling shutter camera and the entire image sensor of the global shutter camera are exposed. Consequently, the selected pixel specifies the synchronization point. Depending on the situation, the synchronization point can be arranged at will in the area of overlap.

In a further preferred embodiment, the camera system is designed in such a way that the global shutter of the telephoto camera image is synchronized to the center of the area of overlap. In this particular embodiment, the global shutter is accordingly triggered if a central pixel in the area of overlap is exposed by the rolling shutter. In this way, a central region of the captured image can be captured with a high distance accuracy. This can be advantageous in order to be able to recognize, for example, objects such as, for example, a lost load on roadways (motorways, country roads) at large distances.

The camera system is preferably designed, in the event of an object which is relevant with respect to the driving situation being recognized, to synchronize the global shutter of the telephoto camera image so that it is triggered if the recognized object is exposed in the wide-angle camera image. In this embodiment, the global shutter is triggered if the relevant object is exposed by the rolling shutter in the wide-angle camera. This means that the synchronization of the two cameras is adapted when a relevant object is recorded so that an alternative synchronization is possible. After the relevant object has left the capturing region of the camera system, a regular synchronization of the cameras takes place again. In this way, it is possible to perform an accurate size and distance determination of the recognized object. Such an object can, for example, be another road user such as a car or pedestrian or even an obstacle or a traffic sign.

In a further preferred embodiment, the rolling shutter camera has an aperture angle between 100° and 140°, preferably between 110° and 130° and, particularly preferably, of 120°.

Furthermore, it is advantageous that the global shutter camera has an aperture angle between 15° and 35°, preferably between 20° and 30° and, particularly preferably, of 25°.

The global shutter camera particularly preferably has a resolution in pixel/degrees that is $2^n$ times higher than that of the rolling shutter camera. The exponent n is selected from the set of natural numbers and 0.

In a further preferred embodiment, the camera system is designed in such a way that a trigger signal is output to an illumination source which can be operated in a pulsed manner such that the illumination source is operated synchronously with the global shutter camera. It is advantageous to use the pulsed illumination with the global shutter camera, since the illumination can be accurately synchronized with the shutter. Due to the pulsed illumination, the detection performance for the global shutter camera is in particular improved at night or in poor visibility.

The camera system particularly preferably comprises the illumination source which can be operated in a pulsed manner and the illumination source is designed to provide illumination in the invisible wavelength range. An invisible pulsed illumination is advantageous so as not to dazzle other road users. The pulsed illumination is preferably infrared illumination. However, other light spectrums which are invisible to humans would also be conceivable.

The camera system is preferably designed in such a way that the resolution in the area of overlap of the cameras is upscaled by interpolation of the resolution of the wide-angle camera image.

Thanks to the interpolation, a similar resolution of the cameras can consequently be simulated in the area of overlap.

Furthermore, the invention relates to a method for synchronizing a camera system, in particular a stereo camera system, for a driver assistance system, comprising a first camera having a first aperture angle and a second camera having a second aperture angle, the first camera producing a wide-angle camera image and the second camera producing a telephoto camera image, the two camera images having an area of overlap, wherein the first camera is a rolling shutter camera and the second camera is a global shutter camera, the global shutter camera being synchronized to a time, at which a specific pixel of the rolling shutter camera is exposed in the area of overlap.

BRIEF DESCRIPTION OF THE DRAWINGS

Further features, effects and advantages of the invention are set out by the description of preferred exemplary embodiments of the invention, wherein.

DETAILED DESCRIPTION OF EXAMPLE EMBODIMENTS OF THE INVENTION

Figure 1:
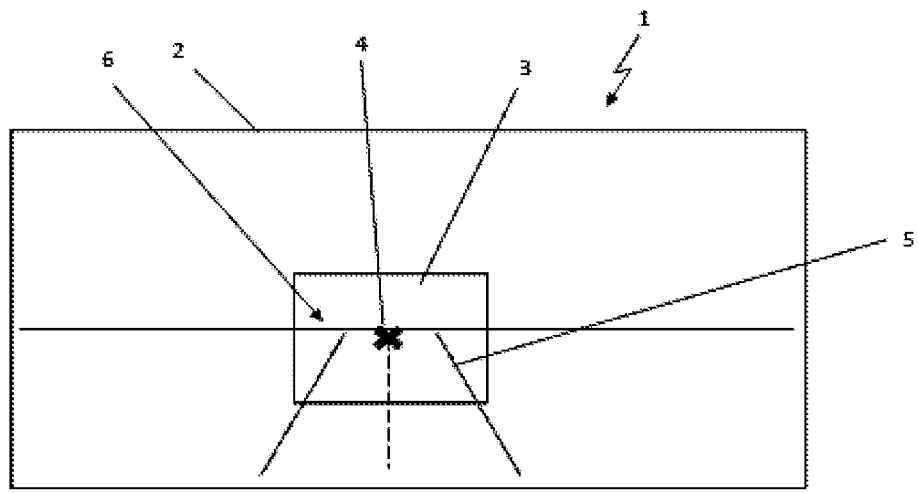
FIG. 1: shows an exemplary representation of an image captured by the camera system according to a preferred embodiment.

FIG. 1 shows an exemplary representation of an image 1 captured by the camera system 10 according to a preferred embodiment. In this representation, a wide-angle camera image 2 and a telephoto camera image 3 are shown. Furthermore, an area of overlap 6 of the two camera images 2, 3 can be seen. The synchronization point 4 is located within this area of overlap 6. This synchronization point 4 is specified by a pixel which is located centrally within the area of overlap 6. The synchronization accordingly takes place if the central pixel or respectively the synchronization point 4 is exposed by the rolling shutter. Furthermore, a roadway 5 is shown in this representation.

Figure 2:
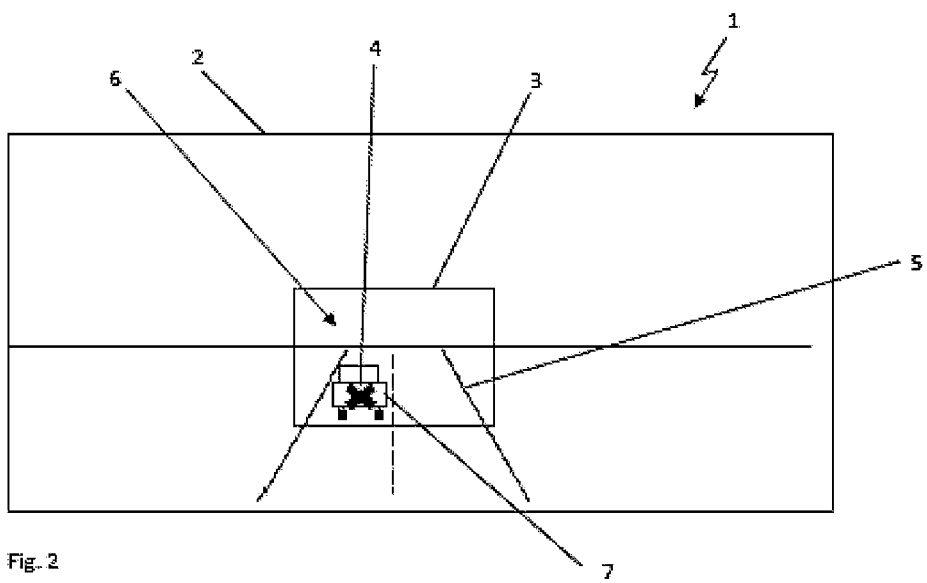
FIG. 2: shows a further exemplary representation of an image captured by the camera system according to a preferred embodiment.

FIG. 2 shows a further exemplary representation of an image 1 captured by the camera system 10 according to a preferred embodiment. As in FIG. 1, the individual camera images 2, 3 and the area of overlap 6 are shown here. Furthermore, the roadway 5 can likewise be recognized.

However, a relevant object 7 is recorded in this representation. In this case, the relevant object 7 is a further vehicle located on the roadway 5. Due to the recording of said object 7, the synchronization point 4 is displaced from the center of the camera image 1 so that the latter is now located centrally on the object 7. Consequently, the global shutter is not triggered until the pixel of the displaced synchronization point 4 is exposed by the rolling shutter.

Figure 3:
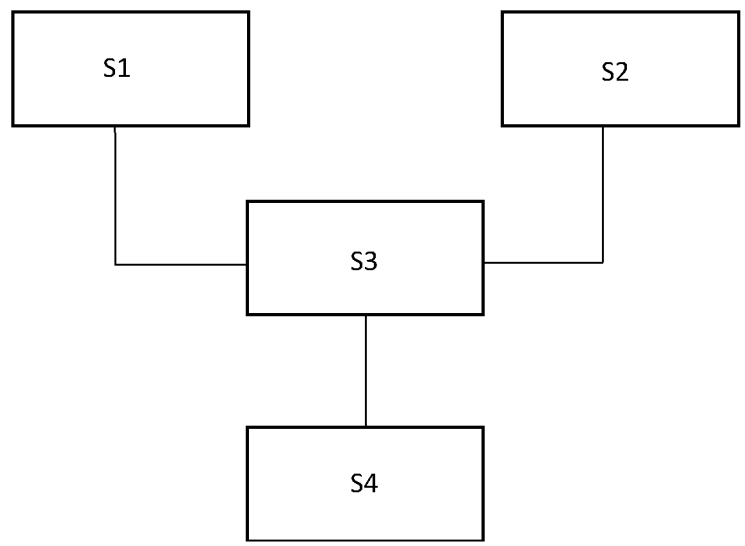
FIG. 3: shows a schematic flow chart for a method according to the invention.

FIG. 3 shows a schematic flowchart for a method according to the invention. In step S1, a wide-angle camera image 2 is captured. Parallel to this, a telephoto camera image 3 is captured in step S2, which is initially synchronized so that it is triggered, in a step S3, if the center of the area of overlap is exposed in S1. The area of overlap has previously been established in a calibration step. This can, for example, already be performed by the factory. The area of overlap 6 of the two images can, however, be continually slightly recalibrated online. In step S4, the synchronization of the global shutter camera is adapted if an object is detected in the area of overlap.

Figure 4:
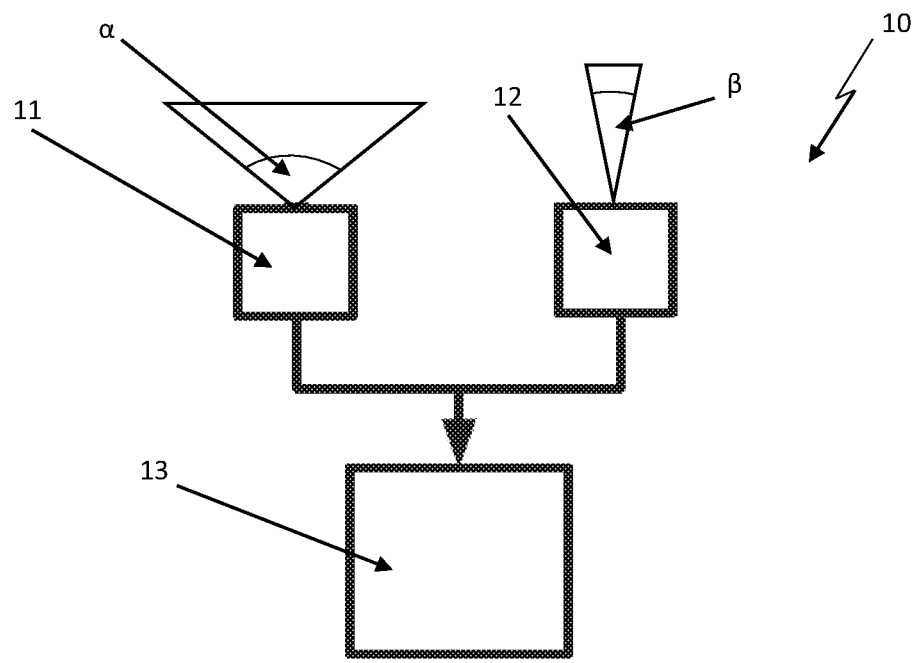
FIG. 4: shows a schematic view of a camera system according to the invention.

FIG. 4 shows a schematic view of a camera system 10 according to the invention. Two cameras 11 and 12 are shown here. These cameras 11, 12 each have a different aperture angle, namely α and β respectively. Furthermore, one camera is designed as a rolling shutter camera and the other camera is designed as a global shutter camera. The two cameras 11, 12 are, in turn, connected to an image processing module 13.

LIST OF REFERENCE NUMERALS

1 Camera image
2 Wide-angle camera image
3 Telephoto camera image
4 Synchronization point
5 Roadway
6 Area of overlap
7 Vehicle
10 Camera system
11 First camera
12 Second camera
13 Image processing module
α First aperture angle
β Second aperture angle
S1-S4 Method steps

The invention claimed is:

1. A stereo camera system, for a driver assistance system, comprising a first camera having a first aperture angle and a second camera having a second aperture angle, the first camera producing a wide-angle camera image and the second camera producing a telephoto camera image, the two camera images having an area of overlap,
wherein the first camera is a rolling shutter camera and the second camera is a global shutter camera, and wherein the stereo camera system is configured so that the first and second cameras are synchronized with one another.

2. The stereo camera system according to claim 1, the rolling shutter camera being configured to trigger the synchronization.

3. The stereo camera system according to claim 1, configured so that a global shutter of the global shutter camera is synchronized to a center of the area of overlap.

4. The stereo camera system according to claim 1, configured to synchronize a global shutter of the global shutter camera to be triggered when an object, which is relevant to a driving situation and has been recognized in the area of overlap, is exposed in the wide-angle camera image produced by the rolling shutter camera.

5. The stereo camera system according to claim 1, wherein the first aperture angle of the rolling shutter camera is between 100° and 140°.

6. The stereo camera system according to claim 1, wherein the second aperture angle of the global shutter camera is between 15° and 35°.

7. The stereo camera system according to claim 1, wherein the global shutter camera has a resolution in pixel/° which is $2^n$ times higher than a resolution of the rolling shutter camera.

8. The stereo camera system according to claim 1, configured to output a trigger signal to an illumination source, which can be operated in a pulsed manner, to operate the illumination source synchronously with the global shutter camera.

9. The stereo camera system according to claim 8, further comprising the illumination source which is configured to produce illumination in an invisible wavelength range.

10. The stereo camera system according to claim 1, configured to upscale, by interpolation, a resolution of the wide-angle camera image in the area of overlap.

11. The stereo camera system according to claim 1, wherein the first aperture angle of the rolling shutter camera is between 110° and 130°.

12. The stereo camera system according to claim 1, wherein the first aperture angle of the rolling shutter camera is 120°.

13. The stereo camera system according to claim 1, wherein the second aperture angle of the global shutter camera is between 20° and 30°.

14. The stereo camera system according to claim 1, wherein the second aperture angle of the global shutter camera is 25°.

15. The stereo camera system according to claim 1, configured so that the producing of the telephoto camera image by the global shutter camera is synchronized with an exposing of a selected portion of the area of overlap of the wide-angle camera image being produced by the rolling shutter camera.

16. The stereo camera system according to claim 15, wherein the selected portion comprises a specific pixel of the wide-angle camera image.

17. A method of synchronizing a stereo camera system, for a driver assistance system, wherein the stereo camera system includes a first camera having a first aperture angle and a second camera having a second aperture angle, wherein the first camera is a rolling shutter camera and the second camera is a global shutter camera, and wherein the method comprises:
    with the first camera producing a wide-angle camera image, and with the second camera producing a telephoto camera image, wherein the two camera images have an area of overlap, and
    synchronizing the global shutter camera to a time at which a specific pixel of the rolling shutter camera is exposed in the area of overlap during the producing of the wide-angle camera image.

\* \* \* \* \*